Sept. 4, 1956     L. FINCHELSTEIN ET AL     2,761,939
APPARATUS FOR WELDING BY MEANS OF ELECTROMAGNETIC
INDUCTION HEATING
Filed June 20, 1952     3 Sheets-Sheet 1

INVENTORS:
LAZARE FINCHELSTEIN &
ANTOINE RODOLPHE BAFFREY
BY:

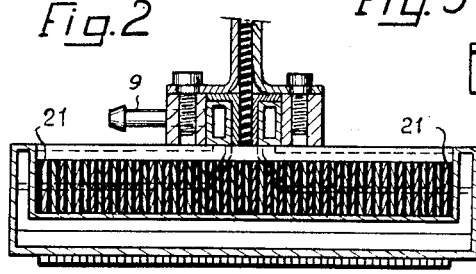
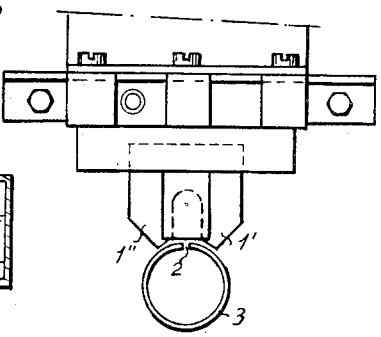
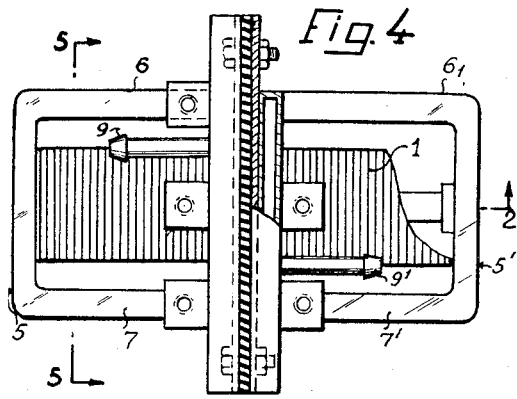
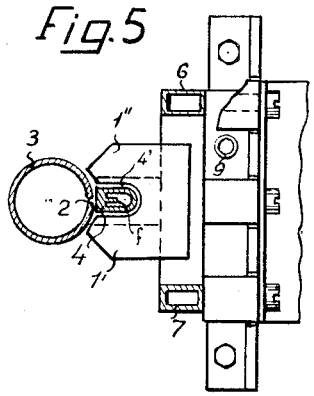
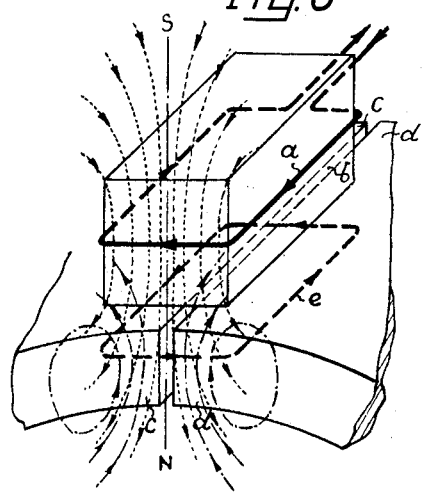
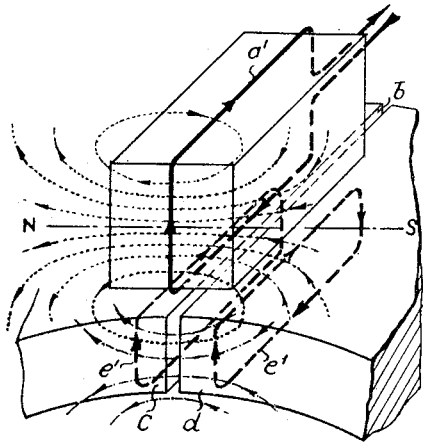

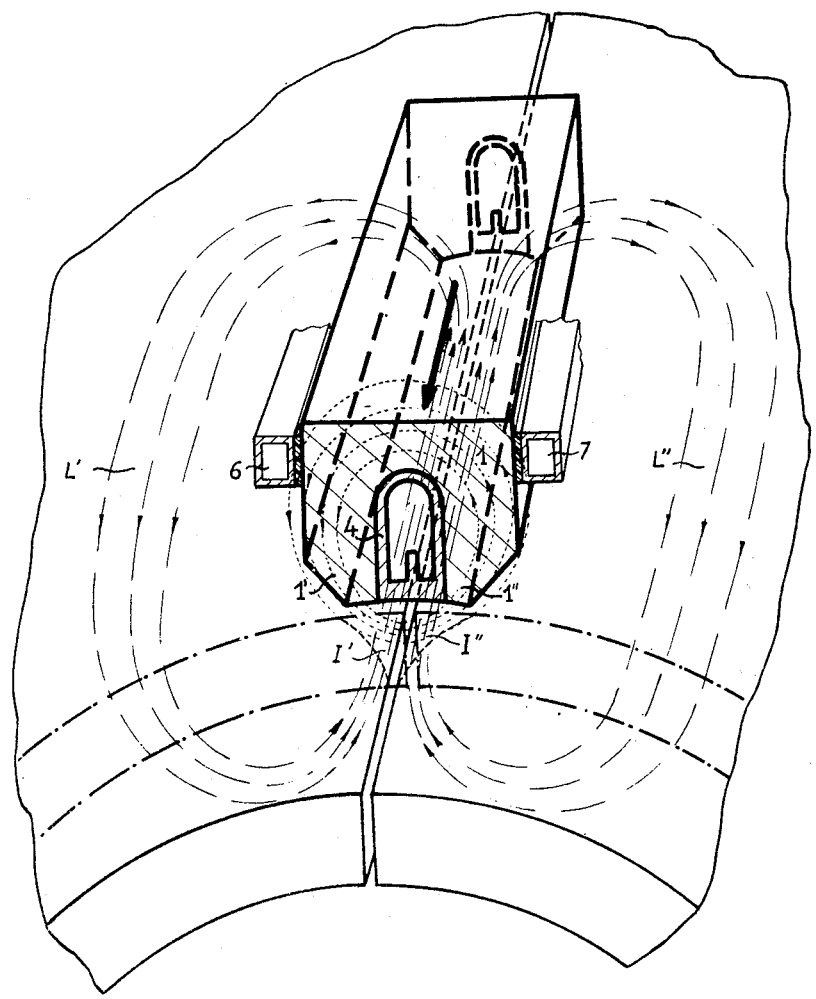

United States Patent Office 2,761,939
Patented Sept. 4, 1956

2,761,939

APPARATUS FOR WELDING BY MEANS OF ELECTROMAGNETIC INDUCTION HEATING

Lazare Finchelstein, Paris, France, and Antoine Rodolphe Baffrey, Mehul, Liege, Belgium, assignors to Societe Metallurgique Technique et Commerciale, Casablanca, Morocco, a company of French Morocco Application June 20, 1952, Serial No. 294,562

Claims priority, application France November 30, 1948

15 Claims. (Cl. 219—8.5)

This application is a continuation-in-part of our copending application filed November 22, 1949, under Serial No. 128,792.

This invention relates to butt-welding of metal sheets, the edges of which may be rectilinear or flanged or of other shapes and is more particularly intended for manufacturing pipes made of welded sheets.

In all known electric welding processes, such as resistance welding or welding by induction heating using an inductor coil of a tubular shape through which the pipe is continuously drawn or again in the high frequency apparatus in which the magnetic flux is produced by means of an inductor coil of flat type lying in a plane substantially parallel to the sheets to be heated, the induced currents flow across the air gap between the edges to be welded, so that the welding operation depends upon the physical conditions of said edges. It is then necessary to prepare accurately cut and smooth surfaces clean-set such as by etching to ensure a uniform current distribution through the joint cross-section. Moreover, the heat is distributed over a comparatively large portion of the lips, which reduces the thermic efficiency.

The main object of this invention is to provide an induction butt-welding apparatus comprising an inducing conductor disposed opposite, along and near the edge portions or lips to be welded in overlapping relation therewith, whereby the lines of magnetic force penetrate into the metal mass through one of said edge portions, flow across the air gap in a direction substantially right-angled with the edges of said edge portions and leave the metal mass from the other edge portion. This inductor produces secondary induced currents flowing in the edge portions parallel to the welding path and concentrated therein. These secondary currents form two independent secondary loops which do not cross the space between the edges of the slot.

According to another feature of the invention, the induced currents follow two separate image secondary loops, each of which is entirely confined within the metal mass of one edge portion.

With this arrangement, the welding conditions no more depend upon the physical state of the edge portions nor of the gap therebetween, which permits welding raw sheets which have not been subject to any machining or cleaning process. Another advantage of this arrangement is that of concentrating the thermal flux in the edge portions, so that the bond is very reliable. Still another advantage is that the mass of the welded sheets which is not operated upon remains comparatively cold, which permits obtaining a remarkable forging action. Pipes welded by means of the apparatus according to the invention therefore resist to high-pressure internal tests.

Another object of the invention is to provide a welding apparatus of the type described in which the electromagnetic induction field is generated by an alternating current having a frequency comprised between 500 and 15,000 C. P. S.

This permits, in particular, avoiding the well known skin effect owing to which, when frequencies of higher value, e. g. comprised within the radio frequency range, are used, only a very thin layer of the metal surface is heated, thereby materially reducing the travelling speed of the pipe.

Still another object of the invention is to provide, in an induction butt-welding apparatus of the type described, a magnetic core, supporting and embedding the above-mentioned inducing conductor and having two pole-pieces of opposite polarity forming the ends of said core and offering an elongated form, said pole-pieces being placed near and opposite the edges of the work-piece to be welded on the two sides of the path of the joint and in lateral relation to the work-piece.

Such a core may be provided due to the value of the frequency range used and its presence permits accurately localizing the induced currents in the two edges of the bond, while increasing the power transfer efficiency through magnetic coupling.

Another object of the invention is to provide, for each inductor of the apparatus, a magnetic core as described above which supports all conductors of the inducing loop, the magnetic mass completely filling the space comprised between said conductors.

Still a further object of the invention is to provide an induction butt-welding apparatus of the type described having a high efficiency and providing a high output rate which is obtained by travelling the work-piece through the inducing field at a high speed.

Now, to increase the travelling speed, it is indispensable to extend the path along which the pipe is subjected to heating.

On the other hand, if one single inductor of a great length is used, this gives rise to difficulties for cooling the inductor, which is generally made by circulating water within the hollow conductors. Moreover, it is practically impossible, without risking failures, to increase the travelling speed by using a high current in the inducing conductor, the value of said current being limited by the maximum strength consistent with the cooling power.

Another object of the invention is to provide an induction butt-welding apparatus of the type described in which the induction path comprises a plurality of successive sections thanks to the use of at least two separate inductors located in series.

With this arrangement, when the inducing path reaches a certain length and, in particular, when the pipe is comparatively flexible, it is necessary to keep the pipe suitably aligned with the inducing conductors.

Still a further object of the invention is to give each inductor a length sufficiently reduced to keep the seam aligned along each one of them, guiding means being interposed between the successive inductors to maintain the general alignment of the pipe.

According to another feature of the invention, said guiding means may be so designed as to ensure in the same time a progressive approach of the lips, thus reducing the gap therebetween as the pipe is driven in front of the successive inductors.

Another object of the invention is to provide an induction butt-welding apparatus of the type described, in which the above-mentioned guiding means also prevents the pipe from rotating around itself while travelling through the induction field.

The use of separate inductors has the further advantage of permitting separate adjustment of their position on the apparatus, separate cooling and separate feeding with inducing current.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 2 is a cross-sectional view through line 2—2 of Fig. 4.

Fig. 3 is a side view of the device shown in Fig. 1.

Fig. 4 shows one of the inductors from above.

Fig. 5 is a side view along line 5—5 of Fig. 4.

Figure 1:
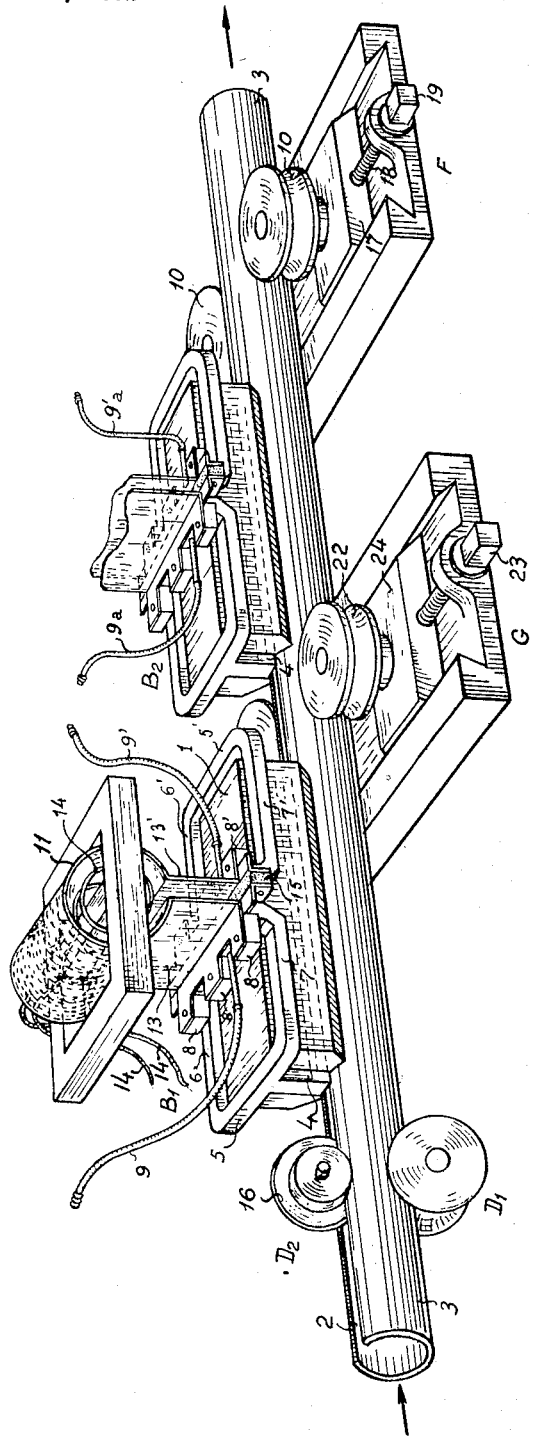
Fig. 1 is a perspective view of a pipe butt-welding apparatus having two inductors according to the invention.

Figs. 6 and 7 comparatively show the diagrams of distribution of the inducing current, induction magnetic field and induced current in a prior known welding apparatus and in a welding apparatus according to the invention, respectively.

Fig. 8 is a diagram illustrating the skin effect.

Referring to the drawings, wherein corresponding parts have been designated by the same reference characters throughout, there is shown a tubular work-piece 3 obtained by rolling around its longitudinal axis a raw sheet or skelp, e. g. of a magnetic metal such as iron, in a suitable machine (not shown) located upstream the welding apparatus according to the invention, so as to bring the edges of said sheet near each other, a slot 2 being thus provided between said edges. Suitable driving means (not shown) are provided to impart the tubular blank with a rectilinear feeding motion in the direction of the arrow of Fig. 1.

A system of rollers $D_1$, $D_2$, the second one of which is provided with a rim 16 engaged in slot 2, holds the same in an invariable angular position, as the tubular blank 3 is fed into the apparatus. Said blank, the lips of which are still separated from each other, then penetrates into the field of inductor $B_1$, the mid-longitudinal plane of said inductor passing through slot 2, as shown in Figs. 3, 5 and 7.

1 is the core of inductor $B_1$, which core is constituted by a stack of insulated sheets of magnetic iron arranged transversally with respect to the longitudinal axis of the seam and squeezed together by tubular conductors 5—5' described hereafter. Core 1 presents pole tips 1', 1" disposed on either side of the seam, symmetrically with respect thereto, preferably, to improve the transmission of the magnetic flux, the end surfaces of said pole-tips are given a rounded shape corresponding to that of the tubular wall.

The inductor extends longitudinally in a direction parallel to the seam, the plane of symmetry of the pole-tips passing through the seam along its whole length. Inside the notch 4' comprised between the pole-tips is disposed a conductor 4 carrying an inducing alternating current and constituted by a rectangular tube made of copper in which cooling water may be circulated. Said tube is, moreover, provided with an inner additional cooling fin $f$. Tubular conductor 4 extends longitudinally in a direction parallel to slot 2 opposite thereto.

A spacing of, e. g. about 2 mm., is provided between the pole tips and the tubular work-piece and the above-mentioned conductor 4 is spaced by substantially the same distance from the outer seam surface. The last mentioned distance may be matched to the required conditions of speed, material thickness, pipe diameter, etc. One end of the tubular conductor 4 is connected through a tubular conductor 5 to two parallel conducting tubes 6 and 7 which are both connected to a common terminal fixture 8. Similarly, the other end of conductor 4 is connected through a tubular conductor 5' to two parallel conducting tubes 6' and 7' and, thence, to a common terminal fixture 8'. An insulating block 15 is interposed between the above-mentioned terminals. Conductors 6, 6', 7 and 7' constitute together a kind of rectangular ring closely embracing the laminated core of the inductor. Between core 1 and rectangular ring 6—7 is interposed a suitable insulating material, as shown at 21 (Fig. 2).

Two flat conductors 13 and 13' feed the above-mentioned terminals with a strong alternating current, the frequency of which is preferably selected within the musical frequency range, said current being generated by the secondary winding 11 of a step-down transformer, the primary winding 14 of which is fed by an alternator (not shown). It has been found that a frequency comprised between 500 and 15,000 C. P. S. has given the best practical results for welding gas or water distribution tubes, for which purposes the apparatus according to the invention is particularly well adapted.

Both tubular conductors 6 and 7 fed from conductor 13 through input terminal 8 feed in turn in parallel the inducing conductor 4 and the current return path after having followed said conductor 4 is further constituted by conductors 6' and 7', the output terminal 8' and the flat conductor 13'.

The apparatus so far described comprising the inductor and the feeding transformer is secured on a structure (not shown) carried by a frame so as to permit an adjustment of the spacing between the pole-tips conducing bar and the pipe to be welded. A circulation of cooling water is ensured by an inlet tube 9 and an outlet tube 9'. In order to increase the density of the magnetic flux which penetrates into the pipe to be welded near the seam, the pole-tips 1', 1" offer a continuously decreasing cross-section towards the air gap. On the other hand, said pole-tips are spaced by a distance which is considerably greater than twice the air gap, so that the whole flux flows through the joint edges and so that the magnetic losses through notch 4' are minimized. The portions of the pipe wall which are located opposite the pole-tips act therefore as an armature closing the magnetic path.

In operation, the sheets of iron are first folded into a circular shape so as to approach the edges of the joint. The pipe is then continuously fed under the inductor. The magnetic flux penetrates into the metal in one edge portion of the seam, crosses the latter, as shown in the diagram of Figs. 7 and 8 and leaves the metal from the other edge of the seam. The heat developed in the iron mass by the induced current and hysteresis losses brings the conducting surfaces to a white brilliancy temperature (about 1300° centigrade) thereby softening the metal which is brought into a plastic state. Under the action of the pressure which is exerted downstream the inductor by forging rollers 10, the metal particles of the whole cross-section of the conducting surfaces penetrate into each other, which ensures an extremely reliable and durable bond capable of supporting internal test fluid pressures of 20 kg./cm.$^2$ or more.

The heat distribution and thus the quality of the joint depend upon the relative position of the lips of the seam with respect to the inducing bar 4, so that it is very important to hold said lips as symmetric as possible, so as to generate between them substantially equal image currents, each one of said currents being distributed in a portion of the lip located opposite bar 4. If the work-piece vibrates or tends to rotate, the slot may be displaced laterally, which would jeopardize the required symmetry.

Applicants have found that up to a well defined travelling speed, it is possible to ensure a perfect welding action by using an inducing bar having such a length that the action of the guiding rollers upstream the inductor, as well as that of the forging rollers downstream the same are sufficient to hold the tubular blank in a suitable aligned position.

If this limit of the travelling speed is to be exceeded, since it depends upon the thermic power generated in the lips which is, in turn, a function of the time during which the pipe remains within the field of the inductor, the solution consists in increasing the length of the latter. To increase said length without giving rise to difficulties of alignment of the seam, a second inductor $B_2$ is arranged according to the invention downstream the inductor $B_1$, the series inductors thus obtained providing a suitable increase of the heating path.

The inductors are preferably spaced by such a distance that a stabilizing device G comprising two rollers 22 arranged in opposite positions may be disposed therebetween to maintain the required alignment conditions. A carriage 24 which is adjustable at will by means of a screw 23 enables the adjustment of the lateral pressure exerted by these rollers.

Inductor B₂ may have the same size as inductor B₁ and it may be fed with electric current in similar conditions. This second inductor is cooled by means of a separate water tubing 9a, 9a' communicating with the hollow bar 4 of the inductor. The system of rollers 22 also enables to bring the lips as near each other as desired, thus reducing the width of the slot, which permits improving the welding conditions.

When leaving the action area of the first inductor B₁, the iron is heated at about 800° centigrade, i. e. above the point of Curie of iron, so that the latter has then lost its magnetic permeability. From this moment, heat is only supplied by induced current losses. It is proposed to adjust the value of the heat supply by bringing the lips as near each other as possible, so that a greater portion thereof is located opposite bar 4 of the second inductor B₂, so as to couple the same with a wider cross-section of the work-piece 3. Thus, said work-piece will leave the action area of inductor B₂ with the slot 2 practically closed, the lips reaching a temperature of about 1300° centigrade.

The roller system 10—10 comprised in the forging device F presses the lips energetically, thus ensuring a perfect welding action similar to a forging effect. The pressure may be adjusted by means of a screw 19 controlling a movable carriage 17 supporting one of the rollers 10.

Since, due to the loss of magnetic permeability above referred to inductors B₁, B₂ operate in different conditions, it may be preferable, in certain cases, to give them different sizes and to feed them separately. For instance, it is possible to give the inductors different lengths and to modify the shape of the pole-tips 1', 1" as well as the cross-section of bar 4; it is also possible to adjust their feeding currents at different values and, even, to feed them with currents of different frequencies.

According to an alternative embodiment of the guiding means, the alignment of the slot may be maintained by means of a guiding roller penetrating between the lips of said slot adapted to resist the high temperature thereof and having no influence upon the magnetic distribution of the induction effect.

To reduce the losses in the magnetic mass of the inductor, the latter may be designed in the shape of a block made of a composite material constituted by a mixture comprising a finely divided magnetic powder embedded in a cooked and molded ceramic mass. These materials offer very weak hysteresis losses, while having a good permeability. An inducing block made of such a material has the advantage of resisting any deformation due to the heat exerted from the white hot pipe.

Fig. 6 shows diagrammatically the electromagnetic conditions obtained with a known device in which a flat inducing coil (of so-called saddle type) is disposed parallel to the metal surface according to the conventional methods used heretofore in the high frequency welding art. The loop $a$ of this coil extends at right angle with the mid-radial plane of seam $b$ between the edges $c$ and $d$ of the pipe and at right angle with the plane of the drawing. The magnetic field which is diagrammatically shown as usual in the shape of lines of force induces current flowing in opposite direction to the inducing current, as shown at $e$. It may be seen that the lines of magnetic force cross the mass of the metal along a direction which is substantially parallel to the contacting surfaces. Each edge of the work-piece closes separately a magnetic path, so that practically no flux flows through the seam. The induced currents shown as secondary loop $e$ have to cross the seam and, thus, the mechanical contact conditions between the edges of said seam exert a considerable influence upon the welding operation. On the other hand, since the magnetic flux is distributed in a comparatively important area of the cross-section of the edges to be welded, the temperature which may be reached for a given travelling speed of the work-piece is comparatively low.

In contradistinction therewith, in a machine according to the invention and as shown in Fig. 7, loop $a'$ is arranged in the mid-radial plane of seam $b$. The magnetic flux crosses the surfaces of the lips in a direction which is substantially right-angled to said surfaces. Magnetic induction in the metal mass generates induced currents which, following along the instantaneous direction of the lines of magnetic force, have paths which are closed in each edge, as diagrammatically shown as image loops $e'$, $e^1$. These induced currents do not cross the seam and the heat generated thereby does not depend on the mechanical state in which the surfaces to be joined are prior to the welding operation. The contact irregularities exert no action upon the strength of the magnetic field, since they are practically negligible with respect to the influence exerted by the air gap between the pole-tips and the metal surface. Since the flux is concentrated in the surface portions of the edges to be joined, the thermic effect is concentrated and the conditions required for welding are rapidly obtained, which permits using a comparatively high travelling speed.

This distribution of magnetic flux lines and secondary current loops corresponds to the use of comparatively low frequency.

If, in order to increase the magnetic coupling the frequency is increased, e. g. to several thousands of cycles per second, the flux distribution would be concentrated more in the marginal face of the skelp and the section of the induced secondary current would present the triangular shape illustrated at I', I", Fig. 8.

Each of these marginal currents build an independent secondary loop L', L" closing in the metal mass without crossing the welding path. The return branches of these loops are distributed over a comparatively large section of the skelp and produce therefore a relatively low heating. Practically, the lateral sides of the skelp remain at such a low temperature that they keep entirely their mechanical strength, thus enabling to exert on them a rather energic forging action.

According to an alternative embodiment, the return paths for the currents induced in the lips may be constituted by a by-pass conductor of very good conducting material applied against the lateral pipe wall.

As clearly shown in Fig. 8, the return bars 6 and 7 are located in the close vicinity of the magnetic core 1 and latter is designed with such a shape as to fill up entirely the gap between bar 1 and 6, on the one hand, and 1 and 7, on the other hand.

The invention is not limited to the precise arrangements shown and described and, namely, the inductor form and disposition may be modified. For example, the cross section of the inducing bar may have any suitable shape and additional cooling fins may be provided. Instead of one single conductor in the notch between the pole-tips, several juxtaposed bars may be used. The feeding conductors may be also given a cross-section and a shape differing from those which have been described and shown and their number may be also modified; e. g. instead of two feeding conductors arranged symmetrically with respect to the plane of the slot, one single feeding conductor may be provided in the plane of the seam at a distance from the lips thereof.

What we claim is:
1. In a pipe butt-welding apparatus operating with electro-magnetic induction heating of a work-piece having metal tubular folded blanks and having a slot be- tween opposite edges thereof, in combination, means for driving continuously the tubular folded blanks of the work-piece along the general direction of the joint, at least two successive inductors, each comprising a single magnetic iron core having two pole-pieces of opposite polarity forming the ends of said core and having an elongated form, to be placed near and opposite the edges of the work-piece to be welded on the two sides of the path of the joint in lateral relationship to the work-piece, said pole-pieces being separated by a notch situated across the path of the joint and extending parallel to the same inducing conductor located in said notch near and opposite the path of the joint an outgoing conductor portion extending upwardly from one end of said inducing conductor, a return conductor portion extending upwardly from the other end of said inducing conductor, and means for pressing the edges of the blanks against each other so as to make a bond therebetween.

2. A pipe butt-welding apparatus according to claim 1, in which said pressing means are constituted by forging rollers arranged immediately downstream the last inductor in the travelling direction of the pipe.

3. In an apparatus for electrically welding pipes from a work-piece consisting of metal sheets having a tubular form with two lengthwise extending opposite edge portions, in combination, means for continuously advancing the work-piece in the axial direction thereof; at least two successive inductors each having a laminated iron core of an elongated form extending in the direction of the advancing of the work-piece, said core including stacked insulated iron sheets placed perpendicularly to said direction, two pole-tips of opposite polarity forming the termination of the sheets, said pole tips being spaced apart and forming a notch extending lengthwise in said direction parallel to the edges of said edge portions; an energizing coil having a hollow tubular form surrounding said core; at least one current-carrying conductor forming part of said coil and having a main portion located inside said notch substantially parallel to the direction of the advancing of the work-piece near and opposite to the edge portions, an outgoing portion extending upwardly from one end of said main portion and a return portion extending upwardly from the other end of said main portion means for supplying an alternating current having a frequency between 500 and 15,000 cycles per second to said coil and a pressing device arranged past and near the last one of said inductors in the travelling direction of the pipe and including rollers arranged at the side of the pipe and exerting a lateral pressure on the walls thereof.

4. In a pipe butt-welding apparatus operating with electro-magnetic induction heating of the edge portions of a tubular bent blank having a joint, in combination, at least two successive inductors each including an energizing coil, means for driving the tubular blank successively through the fields of said inductors; said coil comprising an inducing conductor located parallel near and opposite to the path of the joint and overlapping said edge portions; an outgoing conductor portion extending upwardly from one end of said inducing conductor and a return conductor portion extending upwardly from the other end of said inducing conductor means for pressing the edges of said edge portions against each other when the same have reached welding temperature and guiding means arranged between each pair of successive inductors for keeping the pipe aligned along its whole length with all of said inductors.

5. A pipe butt-welding apparatus according to claim 4, in which said guiding means comprises rollers exerting a lateral pressure, so that the edges of said edge portions are progressively approached as the pipe is travelled through the apparatus.

6. A pipe butt-welding apparatus according to claim 5, further comprising means to adjust said lateral pressure.

7. A pipe butt-welding apparatus according to claim 4, in which the first one of said guiding means further comprises two guiding rollers located upstream the first inductor in the pipe travelling direction and one of which is provided with a rim engaged within the slot between said edges to prevent the same from angular shift around the axis of the pipe, as the latter is fed into the apparatus.

8. In an apparatus for electrically welding pipes from a work-piece consisting of metal sheets having a tubular form with two lengthwise extending opposite edge portions, in combination, means for continuously advancing the work-piece in the axial direction thereof; at least two successive inductors each having a magnetic core of an elongated form extending in the direction of the advancing of the work-piece, said core having two pole-tips of opposite polarity spaced apart and forming a notch extending lengthwise in said direction parallel to the edges of said edge portions; an energizing coil having a hollow tubular form surrounding said core; said coil including an inducing conductor located inside said notch near and opposite to said edge portions; and outgoing and return conductors located near said magnetic core and symmetrically to the mid-plane of the slot and each of which has a portion extending upwardly from a respective end of said inducing conductor, said magnetic core filling up the space between said conductors, means for feeding said coil with alternating current having a frequency between 500 and 15,000 C. P. S. guiding means arranged between each pair of successive inductors for keeping the pipe aligned along its whole length with all of said inductors and a pressing device arranged past and near the last one of said inductors in the travelling direction of the pipe and including rollers arranged at the side of the pipe and exerting a lateral pressure on the walls thereof.

9. In an apparatus for continuously welding together the opposite edges of tubular blanks, in combination, blank feeding means; pressure-welding means; at least two electric inductor units positioned along the path of blank travel between said feeding means and said pressure-welding means, each inductor unit comprising an inducing coil having a main conductor portion extending in close spaced parallel relationship to the edges of the blanks; and means for energizing said inductor units to induce electric current in the edges of the blanks to cause the edges to be heated.

10. In an apparatus for continuously welding together the opposite edges of tubular blanks, in combination, blank feeding means; pressure-welding means; two electric inductor units positioned along the path of blank travel between said feeding means and said pressure-welding means and each having an inducing coil including a main conductor portion extending in close spaced parallel relationship to the edges to be welded; and means for separately energizing said inductor units.

11. In an apparatus for continuously welding together the opposed edges of tubular blanks, in combination, blank feeding means, blank guiding means, and pressure-welding means arranged successively with respect to each other; a first electric inductor unit positioned between said feeding means and said guiding means and a second electric inductor unit positioned between said guiding means and said pressure welding means, each inductor unit having an inducing coil including a main conductor portion extending in close spaced parallel relationship to the edges to be welded; means for energizing said first inductor unit to induce in the edges to be welded an electric current heating the edges to a predetermined temperature; and means for energizing said second inductor unit to induce in the edges to be welded an electric current heating the edges to a temperature different from that provided by said first inductor unit.

12. In an apparatus for continuously welding together the opposed edges of tubular blanks, in combination, blank feeding means; pressure welding means; at least two electric inductor units positioned along the path of blank travel between said feeding means and said pressure welding means, each inductor unit comprising an iron core having two pole tips forming between the same a recess which extends in the direction of blank travel and also comprising an inducing coil having a main conductor portion located in said recess in close spaced parallel relationship to the edges to be welded during blank travel; and means for separately energizing said inductor units.

13. In an electrical butt-welding apparatus operating with electro-magnetic induction heating of the work piece, an inductor comprising a single magnetic iron core having two pole-pieces of opposite polarity forming the ends of said core and having an elongated form, to be placed near and opposite the edges of the work piece to be welded, on the two sides of the path of the joint and in lateral relationship to the work piece, said pole-pieces being separated by a notch situated across the path of the joint and extending parallel to the same; means for driving continuously the work piece through the field of said inductor; and means for pressing the opposite edges of the work piece to be welded against each other when the same have reached welding temperature, whereby the work piece is heated near the edges thereof by the magnetic flux caused by said inductor, the core of said inductor supporting all conductors of the inducing coil and completely filling the space therebetween.

14. In an electrical butt-welding apparatus operating with electro-magnetic induction heating of the work piece, an inductor comprising a single magnetic iron core having two pole-pieces of opposite polarity forming the ends of said core and having an elongated form, to be placed near and opposite the joined edges of the work-piece to be welded, on the two sides of the path of the joint and in lateral relationship to the work-piece, said pole-pieces being separated by a notch situated across the path of the joint and extending parallel to the same; and at least one conductor carrying the energizing current of the inductor and being located in said notch near and opposite the path of the joint, whereby the work-piece is heated near the edges thereof by the magnetic flux caused by said inductor, said energizing current-carrying conductor being constituted by a hollow bar, said inductor further comprising two other hollow bar conductors connected in parallel with the first one, closely surrounding said iron core on either side of its cross section and extending symmetrically with respect to the mid-plane of the slot between said edges, a step-down transformer for feeding said conductors with a strong alternating current having a frequency between 500 and 15,000 C. P. S. and means for circulating cooling fluid through said hollow conductors.

15. An electric butt-welding apparatus according to claim 14, in which the secondary winding of said transformer comprises one single turn.

References Cited in the file of this patent

UNITED STATES PATENTS

| | | |
|---|---|---|
| 1,842,461 | Sessions | Jan. 26, 1932 |
| 2,083,034 | Mishler | June 8, 1937 |
| 2,307,924 | Gillespie | Jan. 12, 1942 |
| 2,419,847 | Mittermaier | Apr. 29, 1947 |
| 2,460,687 | Fuchs | Feb. 1, 1949 |
| 2,582,955 | Body | Jan. 22, 1952 |
| 2,582,963 | Cachat | Jan. 22, 1952 |
| 2,632,840 | Sorensen | Mar. 24, 1953 |